(12) United States Patent
Rocchi et al.

(10) Patent No.: US 6,581,134 B2
(45) Date of Patent: Jun. 17, 2003

(54) LOGIC PARTITIONING OF A NONVOLATILE MEMORY ARRAY

(75) Inventors: Alessandro Rocchi, Rosignano Solvay (IT); Marco Bisio, Modena (IT); Marco Pasotti, San Martino Siccomario (IT); Pier Luigi Rolandi, Volpedo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 113 days.

(21) Appl. No.: 09/817,804

(22) Filed: Mar. 26, 2001

(65) Prior Publication Data

US 2001/0036115 A1 Nov. 1, 2001

(30) Foreign Application Priority Data

Mar. 28, 2000 (EP) .............................. 00830228

(51) Int. Cl.⁷ .............................. G06F 12/00
(52) U.S. Cl. ...................................... 711/103
(58) Field of Search ............... 711/103; 712/37; 365/185.33

(56) References Cited

U.S. PATENT DOCUMENTS 5,627,783 A * 5/1997 Miyauchi ............... 365/185.33
5,987,563 A 11/1999 Itoh et al. .................... 711/103

OTHER PUBLICATIONS

European search report for application No. EP 00 83 0228 dated Sep. 28, 2000.*

* cited by examiner

Primary Examiner—Matthew Kim
Assistant Examiner—Yamir Encarnación
(74) Attorney, Agent, or Firm—Lisa K. Jorgenson; Allen, Dyer, Doppelt, Milbrath & Gilchrist, P.A.

(57) ABSTRACT

A FLASH memory is organized in a plurality of physical sectors which may be split into a plurality of singularly addressable logic sectors. Each logic sector may include a memory space of a predetermined size and a chain pointer assuming a neutral value or a value pointing to a second logic sector associated with a respective chain pointer at the neutral value. Each logic sector may also include a status indicator assuming at least one of a first value if the logic sector is empty, a second value if the data therein belongs to the logic sector, a third value if the data does not belong to the logic sector, and a fourth value if the data has been erased. Further, each logic sector may include a remap pointer assuming the neutral value or a value pointing directly or indirectly to the chain pointer of a third logic sector.

18 Claims, 7 Drawing Sheets

3) Erase operation is started on the sector 3.

4) Reorganization of sectors and conversion table is done.

LOGIC PARTITIONING OF A NONVOLATILE MEMORY ARRAY

FIELD OF THE INVENTION

The present invention relates to the field of electronic circuits, and, more particularly, to a method of managing a memory organized in a plurality of physical sectors.

BACKGROUND OF THE INVENTION

Nonvolatile memories are characterized by their organization of data in physical sectors. A physical sector represents the minimum amount of data that can be erased, even if it is possible to read and write amounts of data smaller than a physical sector. The term "page" is typically used to indicate such minimum amounts. Because of technology improvements, physical sectors have become greater and greater. This affects the management of blocks of data of relatively small size upon which reading, writing and erasing operations may be carried out independently from the rest of the stored data.

As a result of the importance of FLASH memories, the following description will refer to this type of memory, although the invention may be usefully implemented in any kind of nonvolatile memory. One problem associated with managing large physical sectors is found in the personal computer (PC) environment. This is because almost all of the applications for managing mass storage device memories in a PC (e.g., floppy disks, hard disks, memory cards, etc.) use data units of 512 bytes instead of tens or hundreds of Kbytes as is typical of a sector of a FLASH memory. Therefore, an internal organization of single physical sectors is needed to singularly manage each data portion.

A further problem of managing physical sectors of large dimensions is eliminating only a small amount of data in a sector while retaining the remaining data. This is problematic because in FLASH memories it is possible only to erase a whole physical sector and not just a portion of it. One approach to this problem may include having a memory sector (BUFFER) unaccessible by the user for copying and saving data before erasing a particular sector and then restoring the data when the erasing has taken place. To avoid adding a memory device, the BUFFER may be a dedicated sector of the FLASH memory unaccessible by the user. Yet, the sector dedicated to such a function will be subject to repeated programming and erasing cycles with a consequent accelerated degradation compared to other sectors of the FLASH memory.

SUMMARY OF THE INVENTION

It is an object of the invention to provide a method of managing a nonvolatile memory device and a related memory organization including physical sectors that permit reading and writing operations on portions of the memory having reduced dimensions by splitting a physical sector into a plurality of independently addressable logic sectors.

The method of the invention makes the user "see" a physical sector as if it included a number of blocks of data whose pre-established dimensions do not depend from the dimension of the physical sector of the memory. This allows reading, writing and erasing operations even on a single block. The method of the invention is relatively easy and may be implemented without great difficulty by an on board controller/finite state machine of the memory device.

In a memory device where a sector may be erased only as a whole, it is a further object of the invention to provide a method of erasing only a portion of data stored in a physical sector. This is done by using a dedicated unaccessible buffer sector of the memory and while overcoming the known problems of an excessively fast degradation of such a buffer sector.

BRIEF DESCRIPTION OF THE DRAWINGS

Various aspects and advantages of the invention will become clear through the following detailed description of the invention and by referring to the attached drawings, wherein.

DETAILED DESCRIPTION OF THE PREFERRED EMBODIMENTS

Figure 1:
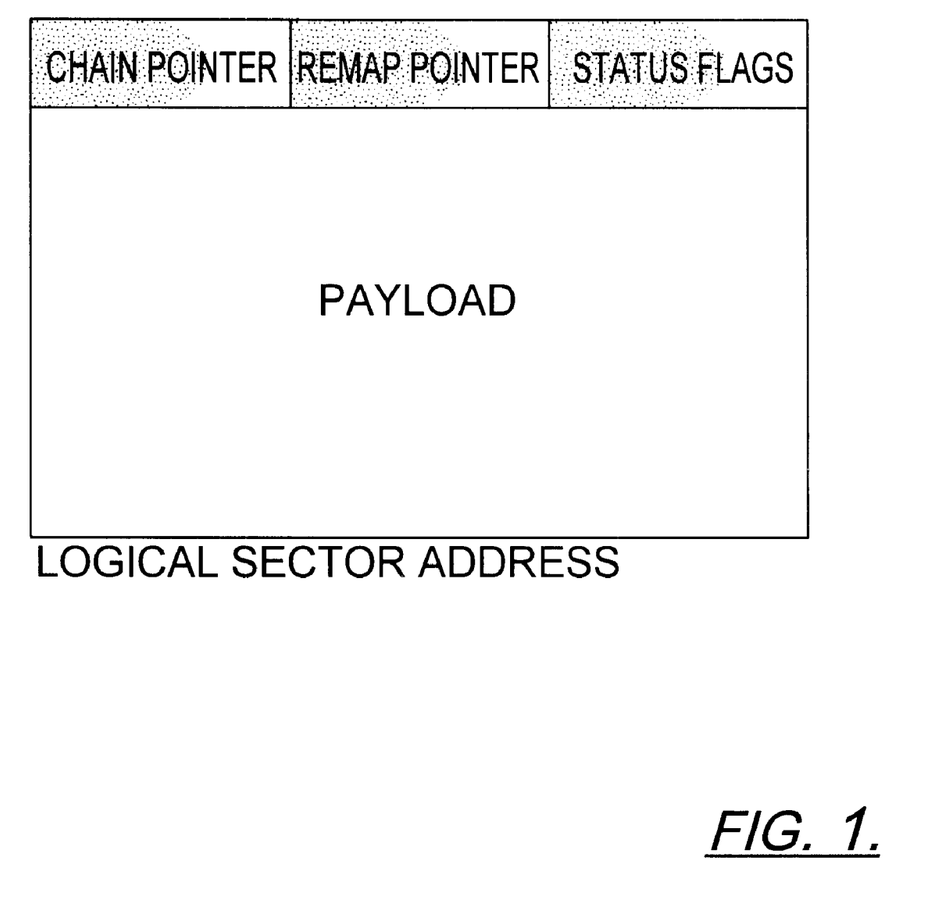
FIG. 1 is a schematic diagram of the structure of a logic sector of the invention.

Generally speaking, the present invention is directed to dividing each physical sector of a memory into blocks called logic sectors, such as the one illustrated in FIG. 1. Each logic sector is a structure of data including a chain pointer CHAIN_PTR, a remap pointer REMAP_PTR, a state indicator STATUS, and a payload space reserved for data storage. The state of a logic sector indicates the condition of the respective payload. For example, STATUS=OD (owner of data) indicates that data relative to a certain sector is in its payload, STATUS=NOD (not owner of data) indicates that the payload of a sector is used to store updated data of another logic sector, STATUS=DEL (deleted) indicates that the logic sector being examined has been logically erased and that data in its payload is no longer valid, and STATUS= FREE indicates a logic sector that has not yet been used.

Because of this memory organization, the memory does not appear to the user as including physical sectors of large dimensions. Rather, it appears to have logic sectors of relatively small dimensions that are individually addressable and whose contents can be updated independently from the other logic sectors. In fact, when the user stores new data in a certain logic sector that already includes other data, the new data is written in a free logic sector, the respective state is set to the value NOD, and the chain pointer CHAIN_PTR of the sector in which the data should have been written is set equal to the address of the sector in which the data has been effectively written.

Figure 2:
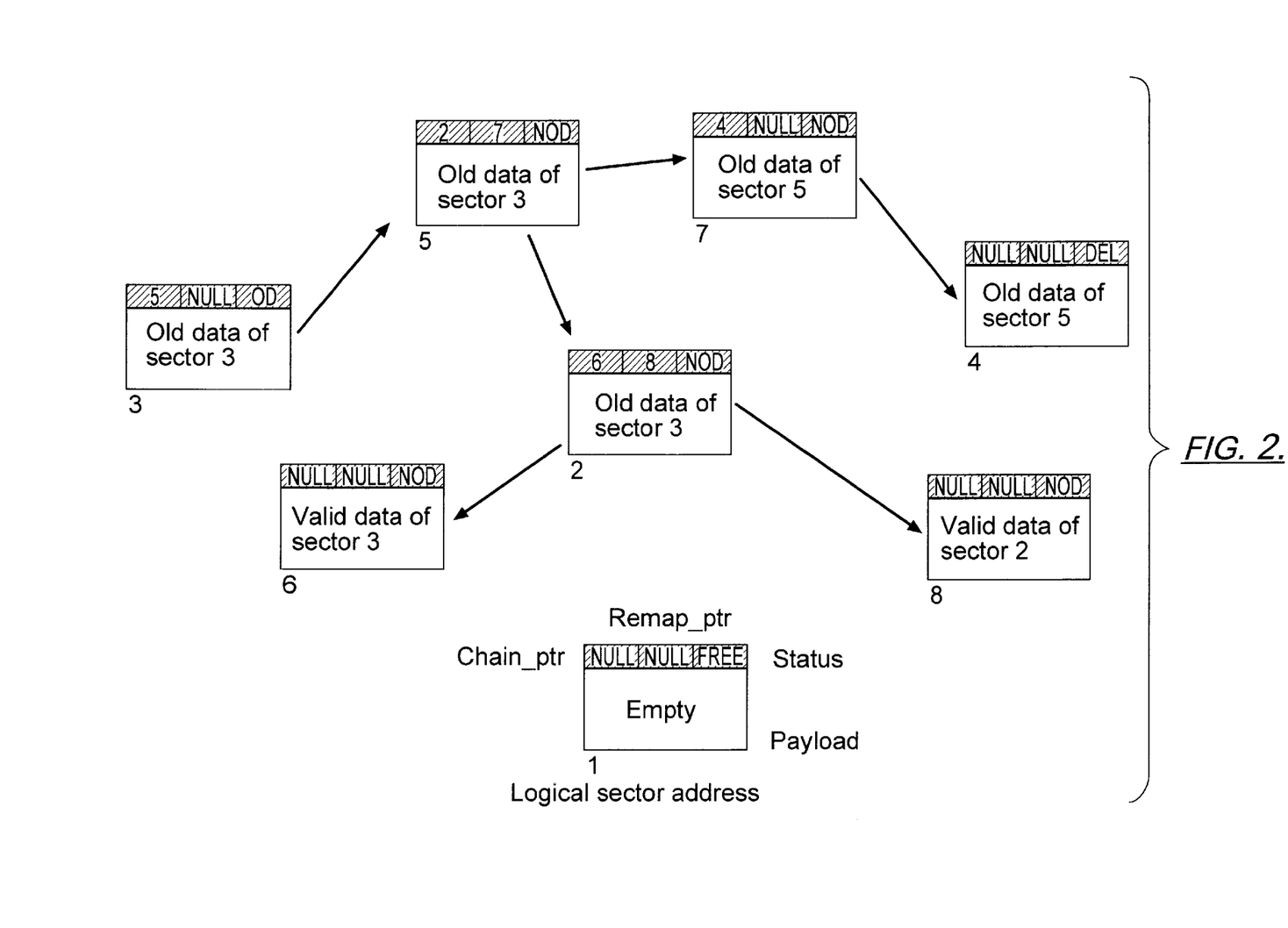
FIG. 2 is a schematic diagram illustrating an exemplary method of managing the logic sectors of a physical sector according to the invention.

If the user stores data in a logic sector that includes data belonging to another sector, the new data is written in a free sector, the relative state is set to NOD, and the remap pointer REMAP_PTR of the sector in which such data should have been written is set equal to the address of the sector in which the data has been effectively written. In order to better understand the method of the invention, let us consider an example of managing a physical sector including eight logic sectors, as illustrated in FIG. 2. It will be assumed that a user must carry out the following sequence of operations:

I. storing data in the logic sector 3;

II. updating data stored in the logic sector 3;

III. updating data stored in the logic sector 3 a second time;

IV. updating data in the logic sector 3 a third time;

V. storing data in the logic sector 2;

VI. storing data in the logic sector 5;

VII. updating data in the logic sector 5; and

VIII. erasing data stored in the logic sector 5.

At the end of the following operations, the configuration is that illustrated in FIG. 2, obtained by the respective operations:

I. writing the data to be stored in the PAYLOAD of sector 3 and setting its STATUS to the value OD;

II. writing the data to be stored in a free sector (e.g., sector 5 because sector 3 is already engaged by its own data), setting the STATUS of sector 5 to the value NOD, and setting the chain pointer CHAIN_PTR of sector 3 equal to the address of sector 5;

III. writing the data to be stored in a free sector, (e.g., sector 2 because sector 3 is already engaged by its own data), setting the STATUS of sector 2 to the value NOD, and making the CHAIN_PTR of sector 3 indirectly address sector 2 (this last operation is carried out by setting the chain pointer of sector 5 equal to the address of sector 2 because the chain pointer of sector 3 is already engaged and addresses sector 5);

IV. writing the data to be stored in a free sector (e.g., sector 6 because sector 3 is already engaged by its own data), setting the STATUS of sector 6 to the value NOD, and making the CHAIN_PTR of sector 3 indirectly address sector 6 (this last operation is carried out by setting the chain pointer of sector 2 equal to the address of sector 6 because the chain pointer of sector 3 directly addresses sector 5, whose CHAIN_PTR directly addresses sector 2);

V. writing the data to be stored in a free sector (e.g., sector 8 because sector 2 is already engaged by data that are not its own data), setting the STATUS of sector 8 to the value NOD, and setting the remap pointer REMAP_PTR of sector 2 equal to the address of sector 8;

VI. writing the data to be stored in a free sector (e.g., sector 7 because sector 5 is already engaged) and setting the STATUS of sector 7 to the value NOD (the status of sector 5 is equal to NOD so its remap pointer REMAP_PTR must be considered and is set equal to the address of sector 7);

VII. writing the data to be stored in a free sector (e.g., sector 4 because sector 5 is already engaged) and setting the STATUS of sector 4 to the value NOD (the STATUS of sector 5 is equal to NOD so its remap pointer REMAP_PTR must be considered, which addresses to sector 7, so the CHAIN_PTR of sector 7 is set equal to the address of sector 4);

VIII. the remap pointer REMAP_PTR of sector 5 must be considered because the STATUS of sector 5 is equal to NOD (the erasing of data stored in sector 5 is carried out setting the status of sector 4 equal to DEL because the REMAP_PTR of sector 5 addresses to sector 7, whose CHAIN_PTR addresses to sector 4).

When the above operations are completed, then the logic sector 3 has been rewritten three times, successively storing new data in sectors 5, 2 and 6. Valid data is stored in sector 6 and can be reached following the chain of pointers CHAIN_PTR starting from sector 3. Further, the logic sector 2 has been remapped to sector 8 because it was used to store data of sector 3. Additionally, the logic sector 5 has been rewritten twice using the sectors 7 and 4 and successively it has been erased (the erasing operation of a logic sector includes making invalid the end of the chain, starting from the sector to be erased, by marking it with the status DEL). Also, the logic sector 1 has not been used and remains free.

By resuming when the payload of a logic sector must be modified, a free logic sector of the same physical sector is linked to the first one and used to store the new payload without actually invoking a physical erasing of the sector. A relation is established via the CHAIN_PTR between the original sector and the one in which the updated data has been written. On the contrary, when data must be written in a PAYLOAD of a logic sector already used in a previously organized chain (i.e., used to store the contents of the PAYLOAD of another logic sector), a remapping of the sector is performed. The pointer REMAP_PRT is used in this case to indicate where the chain of data starts, which is related to a logic sector already used.

The above described procedure may be repeated until there are no more free logic sectors in the particular physical sector. Thus, a data chain is constructed where only the last linked sector includes valid data. When access to a logic sector is requested, it is sufficient to follow the chain of the CHAIN_PTR, originating from the sector to be examined, until its end.

Only when there are no more free logic sectors in a certain physical sector, or upon an explicit command, may a physical erasing of the sector be commanded. In practice this includes saving the valid data related to logic sectors that do not have to be erased, erasing the whole physical sector, and rewriting the saved valid data in the logic sectors of origin, thus simplifying the chain.

The invention may offer the following advantages, for example. The read/write operations of the pointer areas are equally distributed in time and in physical memory space because each physical sector has its own local table of pointers to logic sectors. This minimizes burdening of the area including the pointers to data structures. Furthermore, the invention is significantly efficient when the data management involves relatively small logic sectors, i.e., when it is necessary to manage the memory with a finer granularity of the data structures.

The invention may be implemented to prevent overutilization of a dedicated physical sector by managing the memory as follows. As previously stated, the commonly used technique for erasing a portion of a physical sector includes using a BUFFER sector unaccessible by the user. Before erasing a physical sector, the data to be saved is temporarily saved in this prearranged buffer space. Once the sector is erased, the saved data is copied back into the erased sector. A drawback of this procedure is the exposure of the same BUFFER sector to relatively frequent writing and reading operations, which leads to a premature degradation of this sector.

The present invention provides a method for overcoming this problem. This is done by allowing the user of a memory including k physical sectors to manage partial erasings of no more than k−1 physical sectors without using the same sector unaccessible by the user as the BUFFER. In the following description, the case in which there is only one BUFFER sector is considered, because the memory will thus be used at its maximum capacity. Of course, the method of the invention can be implemented with more than one BUFFER sector.

The k−1 sectors and the BUFFER sector are preferably defined to be transparent to the user so that the user sees a memory with k−1 independently erasable sectors, not to degrade the sector used as the buffer by distributing in time the erasing operations substantially on all physical sectors, and to be easily implemented by the onboard controller of the memory. The algorithm is particularly tolerant of interruptions of write/erase processes (e.g., because of a supply failure), which could leave the contents of the memory in an inconsistent state. A boot routine that the on board controller carries out at the start up sets the content in a consistent condition.

Each physical sector includes a payload and a header including information regarding the data stored in the payload. The header includes the following fields:
1. LOGICAL__ADDRESS: indicates the logical address to which the physical sector is associated;
2. STATUS: indicates the status of the physical sector that can assume the following values:
   Empty: indicates that the physical sector has been erased;
   Busy: indicates that the payload contains data that has not yet been validated;
   GOOD: indicates that the payload includes validated data;
   OLD: indicates that the physical sector should be erased.

Given that the effectiveness of the algorithm of the invention is based upon the reliability of data present in the header, the flags indicating the status of a sector can be stored on several bits. The presence of a determined bit configuration will indicate if the corresponding flag is set or not. In any case, the memory size necessary to store the header remains extremely limited if compared to the size of the payload (a few bytes versus several tens of Kbytes).

Figure 3:
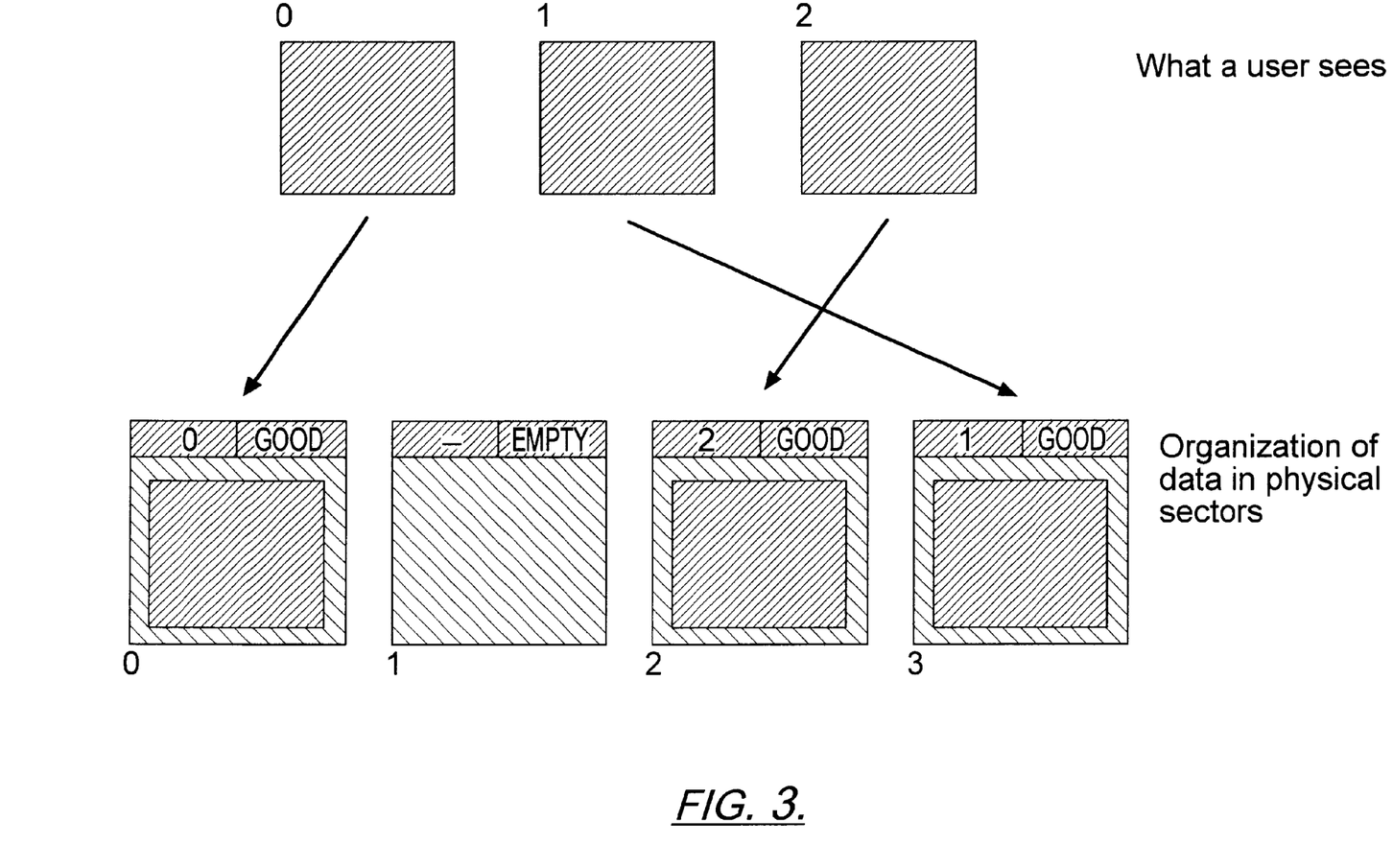
FIG. 3 is a schematic diagram illustrating the organization of the physical sectors of a memory of the invention.

A possible organization of a memory including four physical sectors is schematically shown in FIG. 3. When the user requires read or write access to a certain logical address, the internal controller of the memory redirects the access to the payload of the corresponding physical sector. This can be done in two ways. First, the controller may scan all headers until it finds a physical sector whose LOGICAL__ADDRESS is equal to the desired logical address. Second, at the start-up of the memory device, the controller may build a look up table in which it stores the relations physical sector/logical address.

Figure 4A:
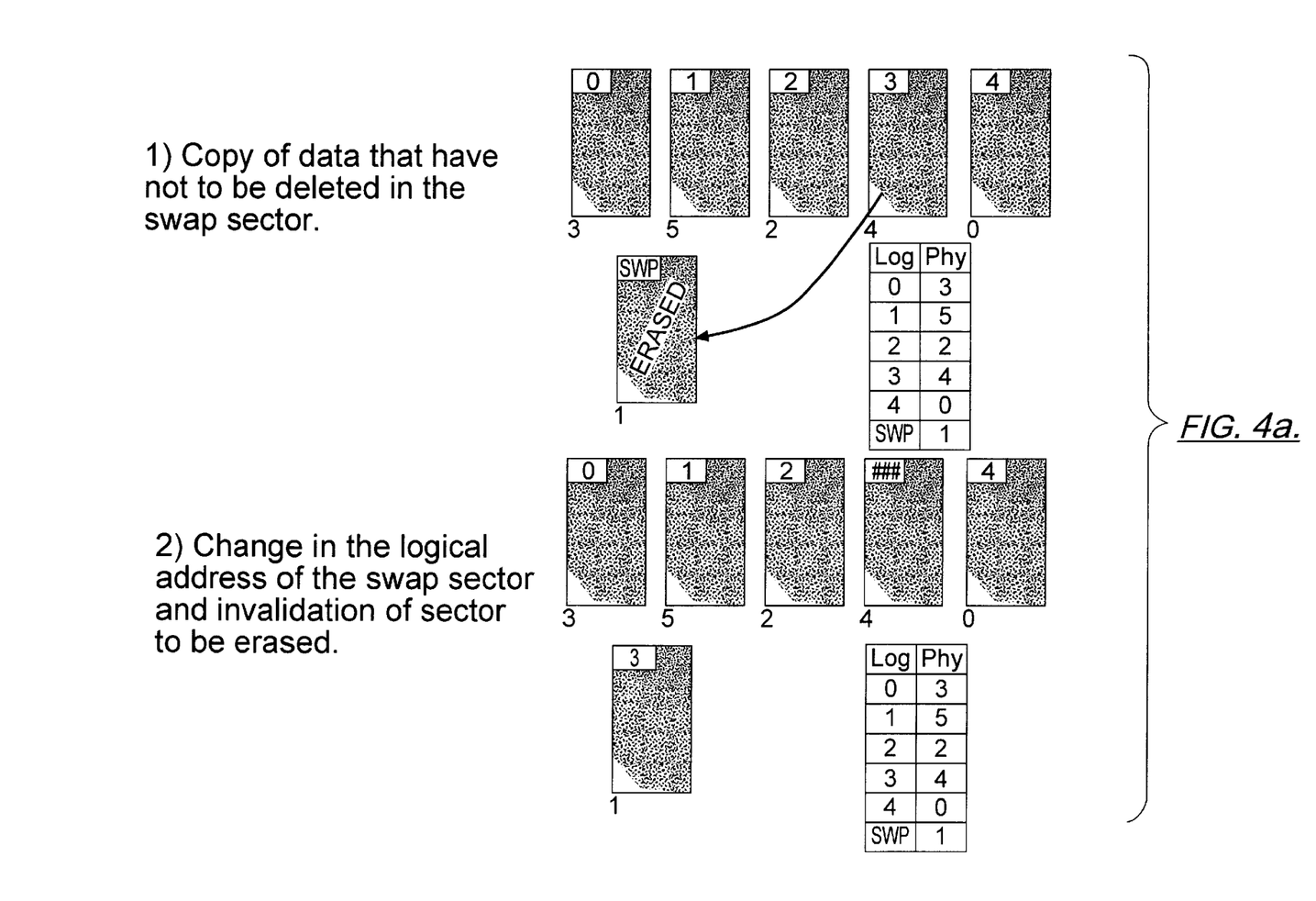
FIGS. 4a, 4b are schematic diagrams illustrating in more detail the steps of erasing a physical sector of a memory of the invention.
Figure 4B:
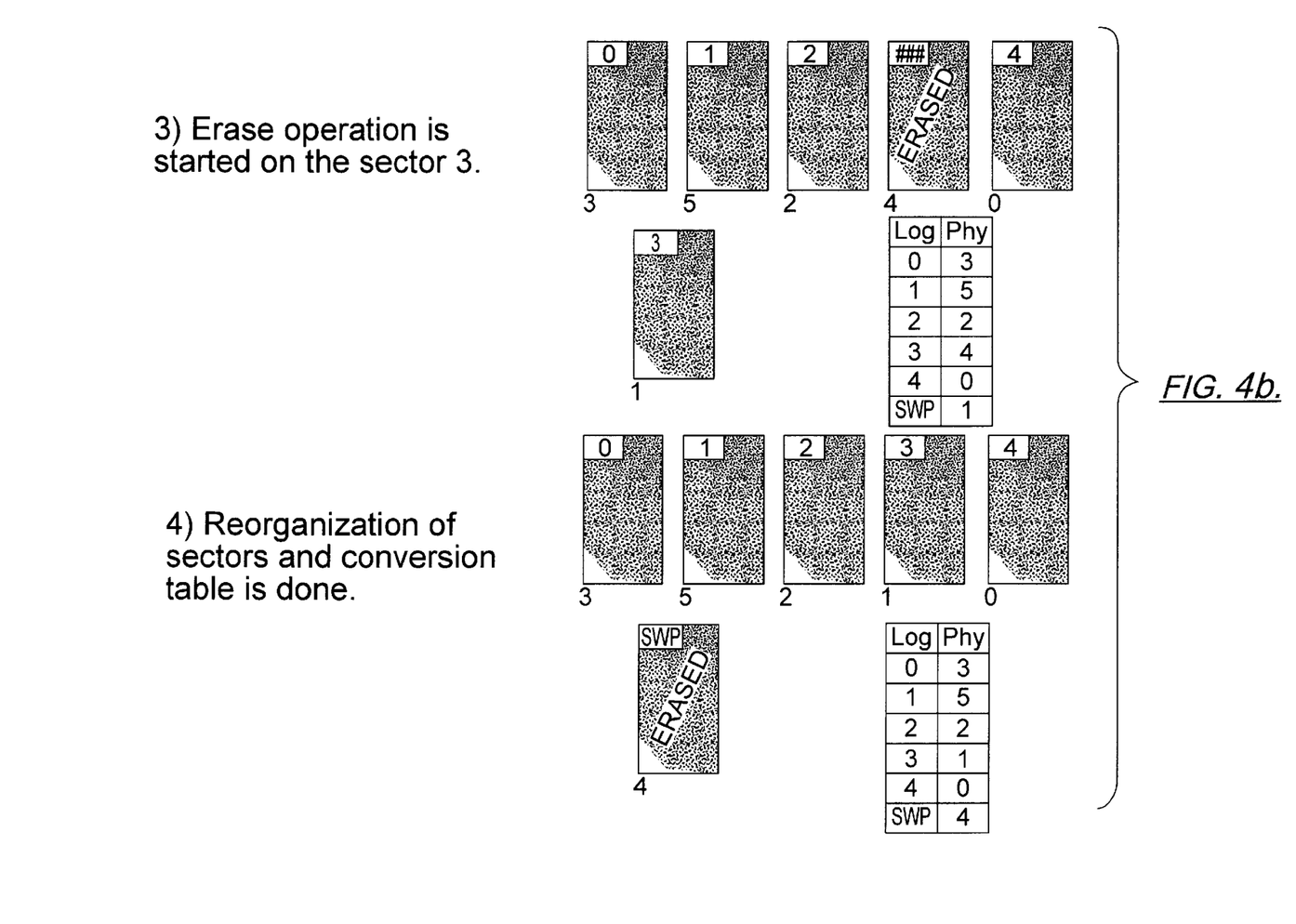

When the user requires a partial erasing of data stored in a physical sector, the algorithm described in FIGS. 4a, 4b is carried out. A free sector is identified and the data to be saved is copied therein, and the same logical address (3) of the physical sector to be erased 4 is attributed thereto. Successively, a neutral address (###) is assigned to the physical sector to be erased 4 and the erasing operation is carried out. Lastly, the look up table is updated. The final result is a memory in which only the desired data is included at the respective logical addresses but stored in different physical sectors.

To erase a physical sector in this way, it is necessary to have at least a free physical sector in which the data to be saved (which is currently being stored in the sector to be erased) may be copied. That is, the method of the invention can be implemented by carrying out the following steps:
1. locating the physical sector PHY__ADDR to be partially erased by its respective logical address;
2. locating the free sector BUF__ADDR, i.e., the one characterized by an EMPTY status in its header;
3. setting STATUS=BUSY in the located free sector at the address BUF__ADDR to indicate that on such a sector a data transfer is going to start and thus it should no longer be considered free;
4. copying the logical address of the sector to be erased partially in the LOGICAL__ADDRESS of the sector addressed by BUF__ADDR;
5. copying the data that must be preserved by the partial erasing from the payload of the sector addressed by PHY__ADDR in the payload of the sector addressed by BUF__ADDR;
6. setting STATUS=GOOD in the sector addressed by BUF__ADDR indicating that its payload includes data to be saved belonging to the physical sector that must be partially erased;
7. setting STATUS=OLD in the sector addressed by PHY__ADDR indicating that its payload no longer contains valid data;
8. erasing the whole sector addressed by PHY__ADDR; and
9. setting STATUS=EMPTY in the sector addressed by PHY__ADDR indicating that its payload is empty.

This algorithm results in locating the sector that had to be partially erased in the sector that initially was free, saving the data not to be erased, and freeing the erased physical sector making it available as a buffer space for future erasing operations. Even if the method of this invention requires a free physical sector of the memory as the known methods of memory management, the mechanism of dynamic allocation of the sectors that are visible by the user substantially guarantees a distribution of the erasing operations on all the physical sectors of the memory.

The steps of the algorithm make it tolerant to interruptions (e.g., because of a supply failure). The boot routine described below, carried out by the internal controller of the memory at the start-up of the device, is able to reset the headers of the physical sectors in a coherent condition by analyzing the status of the various flags. To be sure that all logical addresses are associated with respective physical sectors and that there is at least a physical sector available for the partial erasing algorithm, the method of the invention may include an initializing procedure BOOT__ROUTINE. This procedure is preferably run whenever a supply failure has set the header of a physical sector in an invalid condition and when the memory device is used for the first time, i.e., when there is no organization of data inside the memory.

The BOOT__ROUTINE includes a first routine, BOOT__ERASE, followed by a second routine, BOOT__FORMAT, described below.

Boot Erase

Figure 5:
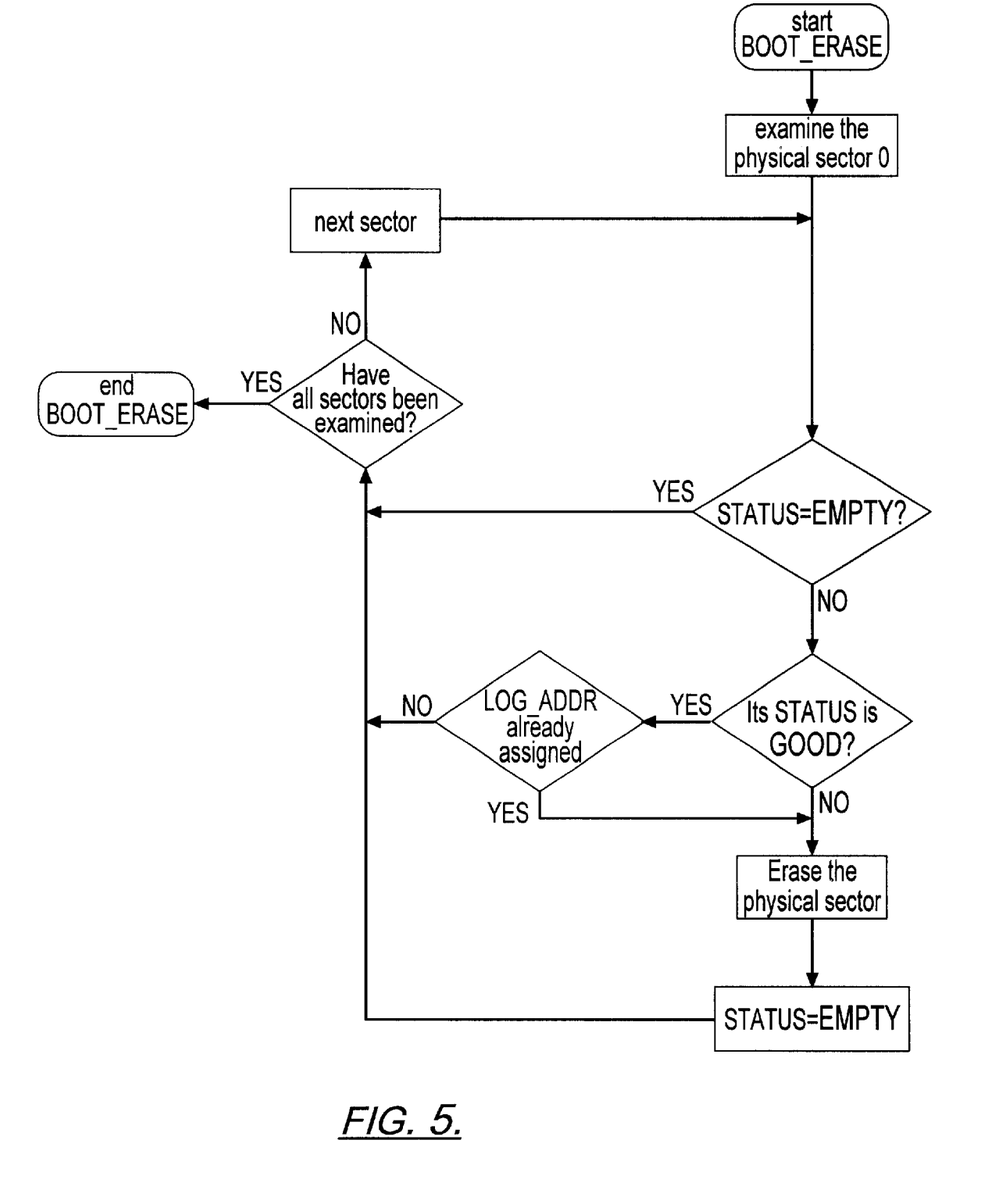
FIG. 5 is a flow chart of the preliminary erasing procedure of the invention.

This routine erases all physical sectors whose STATUS are invalid, i.e., different from EMPTY or GOOD, as illustrated in FIG. 5. In particular, all physical sectors that have:
a STATUS=BUSY, indicating that on the sector being examined a partial erasing (that was interrupted between steps 3) or 4) of the algorithm) was in progress;
a STATUS=OLD, indicating that the sector had to be erased but the erasing algorithm was interrupted after step 7), are also erased;
a STATUS=GOOD but have a LOGICAL__ADDRESS already present in the HEADER of an already analyzed physical sector (indicating that in the memory a same logical address LOGICAL__ADDRESS is present on two distinct physical sectors, which happens when the partial erasing algorithm is stopped at step 6)); and
an invalid status, because a physical erasing operation (step 8 of the algorithm) was in progress on the sector when it was interrupted or because the memory was new. At the end of each erasing operation, the STATUS of the sector is set equal to EMPTY.

It is important to note that irrespective of the reason the controller invokes a physical erasing of a sector, from the point of view of the user there is no data loss. Moreover the BOOT_ERASE routine is tolerant of interruptions, and does not induce unrecoverable states in the data structure of the memory or jeopardize the user's data.

Boot Format

Figure 6:
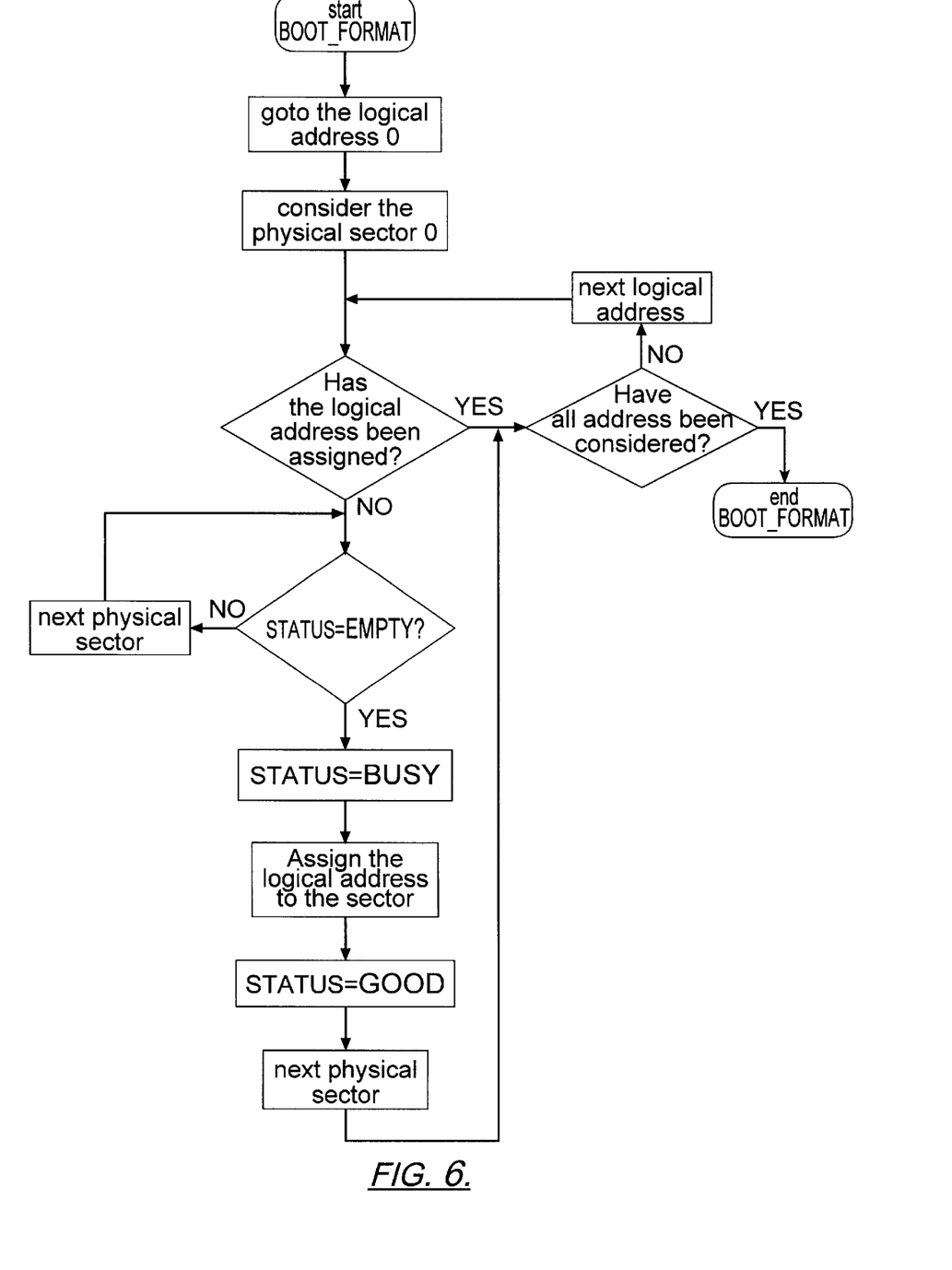
FIG. 6 is a flow chart of the procedure of formatting a memory of the invention.

The BOOT_FORMAT routine, carried out at the end of the BOOT_ERASE routine, ensures that each physical sector is associated with a logical address. The object of the BOOT_FORMAT routine, illustrated in FIG. 6, is to make the memory ready for normal operation by ensuring that all logical addresses have been assigned to as many physical sectors and that there is at least one free physical sector for the partial erasing algorithm. It will be appreciated by those of skill in the art that the BOOT_FORMAT routine tolerates interruptions without inducing unrecoverable states in the data structures of the memory or jeopardizing the user's data.

That which is claimed is:

1. A FLASH memory comprising:
   a plurality of physical sectors each comprising a plurality of singularly addressable logic sectors corresponding to a memory space of a predetermined size, each logic sector comprising a storage space and a header space, the header space comprising
     a chain pointer assuming a neutral value or a value pointing to another logic sector with a chain pointer having the neutral value,
     a status indicator assuming a first value if the storage space of the logic sector is empty, a second value if the data stored in the storage space is for the logic sector, a third value if the data stored in the storage space is not for the logic sector, and a fourth value if the data stored in the storage space has been erased, and
     a remap pointer assuming the neutral value or a value pointing to a chain pointer of another logic sector.

2. The FLASH memory of claim 1 wherein the FLASH memory is initialized by setting the chain pointers and the remap pointers to the neutral value and setting all of the status indicators to the first value.

3. The FLASH memory of claim 1 wherein the value assumed by the chain pointer pointing to the other logic sector points directly to the other logic sector.

4. The FLASH memory of claim 1 wherein the value assumed by the chain pointer pointing to the other logic sector points indirectly to the other logic sector.

5. The FLASH memory of claim 1 wherein the value assumed by the a remap pointer pointing to the chain pointer of the other logic sector points directly to the chain pointer of the other logic sector.

6. The FLASH memory of claim 1 wherein the value assumed by the a remap pointer pointing to the chain pointer of the other logic sector points indirectly to the chain pointer of the other logic sector.

7. A FLASH memory comprising:
   a plurality of physical sectors singularly addressable by a physical address and each comprising
     a memory space of a predetermined size;
     a logical address; and
     a status indicator assuming a first value if said logical address has a neutral value, assuming a second value if said memory space is being written to and if said logical address does not have the neutral value, assuming a third value when said memory space comprises valid data and when said memory space is empty, and assuming a fourth value if said memory space comprises data to be erased.

8. The FLASH memory of claim 7 wherein only one physical sector has an address equal to the neutral value.

9. A method of managing a FLASH memory comprising a plurality of physical sectors each comprising a plurality of singularly addressable logic sectors corresponding to a memory space of a predetermined size, each logic sector comprising a storage space and a header space, the header space comprising a chain pointer assuming a neutral value or a value pointing to another logic sector with a chain pointer having the neutral value, a status indicator assuming a first value if the storage space of the logic sector is empty, a second value if the data stored in the storage space is for the logic sector, a third value if the data stored in the storage space is not for the logic sector, and a fourth value if the data stored in the storage space has been erased, and the header space further comprising a remap pointer assuming the neutral value or a value pointing to a chain pointer of another logic sector, the method comprising:
   initializing the FLASH memory by setting the chain pointers and the remap pointers to the neutral value and setting all of the status indicators to the first value;
   erasing a first predetermined logic sector whose respective chain pointer has the neutral value by setting the respective status indicator of the predetermined logic sector to the fourth value;
   reading data corresponding to a logic sector by
     reading a null value if the respective status indicator of the logic sector has at least one of the first or fourth values,
     if the status indicator has not assumed one of the first or fourth values and if the respective remap pointer of the logic sector has a neutral value, reading at least one of the data stored in the logic sector if the respective chain pointer of the logic sector has a neutral value and the data stored in another logic sector addressed by the chain pointer, and
     if the remap pointer points to a chain pointer of a second predetermined first logic sector, reading data stored in the second predetermined logic sector if the respective chain pointer has the neutral value and in another logic sector addressed by the chain pointer;
   writing data in at least one of the logic sectors by
     writing the data in the respective storage space of the at least one logic sector and assigning to the respective status indicator at least one of the second and third values if the respective status indicator of the at least one logic sector has the first value,
   repeating writing the data and assigning at least one of the second and third values on a first empty logic sector, setting the respective status indicator of the first empty logic sector to have the third value, and setting the chain pointer of the logic sector addressed by the chain pointer of the at least one logic sector to have the address of the first empty logic sector if the status indicator has the second value,
   repeating writing the data and assigning at least one of the second and third values to a second empty logic sector, setting the respective status indicator to have the third value, and setting the respective remap pointer to have the address of the second empty logic sector if the respective status indicator has at least one of the third value and the fourth value and if the remap pointer of the at least one logic sector has a neutral value, repeating writing the data and assigning at least one of the second and third values on a third empty logic sector, setting the respective status indicator to have the third value, setting the respective chain pointer of a logic sector addressed by the remap pointer equal to the address of the third empty logic sector if the remap pointer does not have the neutral value; and re-writing data stored in a physical sector by saving valid data in logic sectors whose respective chain pointers have the neutral value and whose respective status indicators do not have the fourth value, saving the address of the respective logic sector for the valid data, physically erasing the data stored in the physical sector, and writing the saved data in the respective logic sectors and setting the respective status indicators to have the second value.

10. A method of managing a FLASH memory comprising a plurality of physical sectors each comprising a plurality of singularly addressable logic sectors corresponding to a memory space of a predetermined size, each logic sector comprising a storage space and a header space, the header space comprising a chain pointer assuming a neutral value or a value pointing to another logic sector with a chain pointer having the neutral value, a status indicator assuming a first value if the storage space of the logic sector is empty, a second value if the data stored in the storage space is for the logic sector, a third value if the data stored in the storage space is not for the logic sector, and a fourth value if the data stored in the storage space has been erased, and the header space further comprising a remap pointer assuming the neutral value or a value pointing to a chain pointer of another logic sector, the method comprising:

initializing the FLASH memory by setting the chain pointers and the remap pointers to the neutral value and setting all of the status indicators to the first value; and erasing a first predetermined logic sector whose respective chain pointer has the neutral value by setting the respective status indicator of the predetermined logic sector to the fourth value.

11. The method of claim 10 further comprising reading data corresponding to a logic sector by:

reading a null value if the respective status indicator of the logic sector has at least one of the first or fourth values;

if the status indicator has not assumed one of the first or fourth values and if the respective remap pointer of the logic sector has a neutral value, reading at least one of the data stored in the logic sector if the respective chain pointer of the logic sector has a neutral value and the data stored in another logic sector addressed by the chain pointer; and if the remap pointer points to a chain pointer of a second predetermined first logic sector, reading data stored in the second predetermined logic sector if the respective chain pointer has the neutral value and in another logic sector addressed by the chain pointer.

12. The method of claim 10 further comprising writing data in at least one of the logic sectors by:

writing the data in the respective storage space of the at least one logic sector and assigning to the respective status indicator at least one of the second and third values if the respective status indicator of the at least one logic sector has the first value;

repeating writing the data and assigning at least one of the second and third values on a first empty logic sector, setting the respective status indicator of the first empty logic sector to have the third value, and setting the chain pointer of the logic sector addressed by the chain pointer of the at least one logic sector to have the address of the first empty logic sector if the status indicator has the second value;

repeating writing the data and assigning at least one of the second and third values to a second empty logic sector, setting the respective status indicator to have the third value, and setting the respective remap pointer to have the address of the second empty logic sector if the respective status indicator has at least one of the third value and the fourth value and if the remap pointer of the at least one logic sector has a neutral value; and repeating writing the data and assigning at least one of the second and third values on a third empty logic sector, setting the respective status indicator to have the third value, setting the respective chain pointer of a logic sector addressed by the remap pointer equal to the address of the third empty logic sector if the remap pointer does not have the neutral value.

13. The method of claim 10 further comprising re-writing data stored in a physical sector by:

saving valid data in logic sectors whose respective chain pointers have the neutral value and whose respective status indicators do not have the fourth value;

saving the address of the respective logic sector for the valid data;

physically erasing the data stored in the physical sector; and writing the saved data in the respective logic sectors and setting the respective status indicators to have the second value.

14. A method of managing a FLASH memory comprising a plurality of physical sectors singularly addressable by a physical address each comprising a memory space of a predetermined size, a logical address, and a status indicator assuming a first value if the logical address has a neutral value, assuming a second value if the memory space is being written to and if the logical address does not have the neutral value, assuming a third value when the memory space comprises valid data and when the memory space is empty, and assuming a fourth value if the memory space comprises data to be erased, and at least one logical address having the neutral value, the method comprising:

accessing a predetermined physical sector by scanning all physical sectors of the memory and building a look up table associating each scanned physical address with a respective logical address upon start-up of the FLASH memory, and finding the physical address of the predetermined physical sector to be accessed based upon its respective logical address using the look up table;

partially erasing data stored in each physical sector associated with a logical address by locating a free physical sector whose status indicator has the first value, assigning the second value to the respective status indicator of the free physical sector, setting the respective logical address of the free physical sector to have the logical address of the physical sector to be erased, copying in the free physical sector data to be saved that is stored in the physical sector to be erased, assigning the third value to the status indicator of the free physical sector, assigning the fourth value to the respective state of the physical sector to be erased, erasing the data in the physical sector to be erased, assigning the first value to the status indicator of the physical sector to be erased and setting the respective logical address to the neutral value, and updating the look up table; effecting a boot erasing of the memory by examining one by one each physical sector of the FLASH memory and erasing all physical sectors whose status indicator indicates invalid data, has the second value, has the fourth value, and has the third value if the logical address of the physical section is already assigned to a different physical sector, assigning the first value to the respective status indicators of the erased physical sectors, and assigning a respective logical address to any free physical sector not having a logical address; and formatting the memory by examining one by one the physical sectors of the FLASH memory whose status indicator has the first value, setting at least one logical address of a physical sector to have the neutral value, and setting the status indicators of the remaining physical sectors to have the third value and assigning respective logical addresses thereto.

15. The method of claim 14 wherein access to a predetermined physical sector is provided by scanning the physical sectors until verifying an identity of the logical address associated therewith based upon a required address.

16. The method of claim 14 wherein only one physical sector has an address equal to the neutral value.

17. A method for managing a FLASH memory comprising a plurality of physical sectors singularly addressable by a physical address and each comprising a memory space, a logical address, and a status indicator, the method comprising:

assigning a first value to the status indicator if the logical address has a neutral value;

assigning a second value to the status indicator if the memory space is being written to and if the logical address does not have the neutral value;

assigning a third value to the status indicator when the memory space comprises valid data and when the memory space is empty; and assigning a fourth value to the status indicator if the memory space comprises data to be erased.

18. The method of claim 17 wherein only one physical sector has an address equal to the neutral value.

* * * * *